United States Patent [19]
Overman

[11] 4,281,601
[45] Aug. 4, 1981

[54] NON-SLIP TURNING JOINT FOR FUZES

[75] Inventor: David L. Overman, Silver Spring, Md.

[73] Assignee: The United States of America as represented by the Secretary of the Army, Washington, D.C.

[21] Appl. No.: 57,873

[22] Filed: Jul. 16, 1979

[51] Int. Cl.³ .............................................. F42C 9/00
[52] U.S. Cl. .................... 102/276; 285/321; 403/97; 403/320; 403/326
[58] Field of Search ............... 102/276; 285/321, 84; 403/97 R, 326, 320, DIG. 7

[56] References Cited

U.S. PATENT DOCUMENTS

| | | | |
|---|---|---|---|
| 1,932,697 | 10/1933 | Jankovic | 403/97 X |
| 2,216,862 | 10/1940 | Towner | 102/276 |
| 2,448,022 | 8/1948 | Fix | 102/276 |
| 2,609,251 | 9/1952 | Haupt | 403/97 |
| 2,805,089 | 9/1957 | Hansen | 285/317 |
| 3,317,225 | 5/1967 | Cooper | 403/97 X |
| 3,330,594 | 7/1967 | Cadle | 403/97 X |
| 3,459,442 | 8/1969 | Yarmett et al. | 285/321 X |
| 3,715,986 | 2/1973 | Dunlap et al. | 102/276 |

Primary Examiner—David H. Brown
Attorney, Agent, or Firm—Nathan Edelberg; Robert P. Gibson; Saul Elbaum

[57] ABSTRACT

Relative rotation of the two rotational members of a fuze during dynamic condition of firing are eliminated by interlocking annular, serrated, axial seating surfaces of the two members. A radially sinusoidal split ring in between radially adjacent annular recesses of the members cooperates with an inclined wall of the outer member's annular recess to provide an axial force biasing the serrated surfaces into engagement during static conditions. The split ring further serves as a locking device to hold the two members together as an assembly.

7 Claims, 3 Drawing Figures

NON-SLIP TURNING JOINT FOR FUZES

RIGHTS OF THE GOVERNMENT

The invention described herein may be manufactured, used, and licensed by or for the United States Government for governmental purposes without the payment to me of any royalty thereon.

BACKGROUND OF THE INVENTION

The present invention relates generally to fuzes, and more particularly to an improved joint for preventing the relative rotation of the base and cap of the fuze during static and dynamic conditions.

A major concern of fuze designers is to prevent the relative rotation of the base and cap of a fuze under the influence of angular acceleration force during firing. The fuzes of the prior art have generally included adjacent annular engaging surfaces perpendicular to the axis of rotation, said surfaces being substantially smooth. To prevent rotation of the members relative to each other during firing, the frictional engagement of the smooth surfaces has been increased. A typical example of a method to increase the frictional engagement of the rotational parts is illustrated in U.S. Pat. No. 2,216,862. A sinuous resilient band is positioned in mutually registered annular grooves in the adjacent surfaces. The band provides radial force sufficient to increase frictional engagement between the relatively movable parts.

When dealing with smooth engaging surfaces of the members of a fuze of the prior art, the friction inducing elements require a torque of approximately 150 inch-pounds or greater to rotate the members relative to each other to set the fuze in a static condition. Because of the smooth surfaces, this degree of torque is needed to reduce relative motion of the parts during firing. Thus, prior art fuzes are difficult to set and relative motion of the parts is not entirely eliminated during firing. Thus, there exists a need for a fuze joint which is capable of preventing relative movement of the two members of a fuze under the influence of angular acceleration during firing as well as requiring a minimum amount of torque to set the fuze under static conditions.

A SUMMARY OF THE INVENTION

An object of the present invention is to provide a fuze which may be set by the use of low torque.

Another object of the present invention is to provide a fuze which may be easily set by low torque while still being capable of preventing relative movement of the parts during firing conditions.

A further object of the present invention is to provide a non-slip turning joint for a fuze which requires fewer parts than prior fuze devices.

These and other objects of the present invention are accomplished by using the combination of interlocking serrated mating surfaces for the relatively movable members, a sinusoidal split ring and an inclined wall of the outer annular recess for the split ring. The axially interlocking, annular, serrated surfaces of the two rotably connected members of the fuze in combination with setback forces during firing prevent relative rotational movement of the two members during firing. The radially sinusoidal, split ring being compressed against the inclined wall of the annular recess of the inner face of the outer member produces an axial force biasing the interlocking serrated surfaces together so as to require a minimum of 40 inch-pounds torque to rotate the members relative to each other under static conditions.

The objects, advantages and novel features of the present invention will become apparent from the following detailed description of the present invention when considered in conjunction with the accompanying drawings.

DESCRIPTION OF THE PREFERRED EMBODIMENTS

Figure 1:
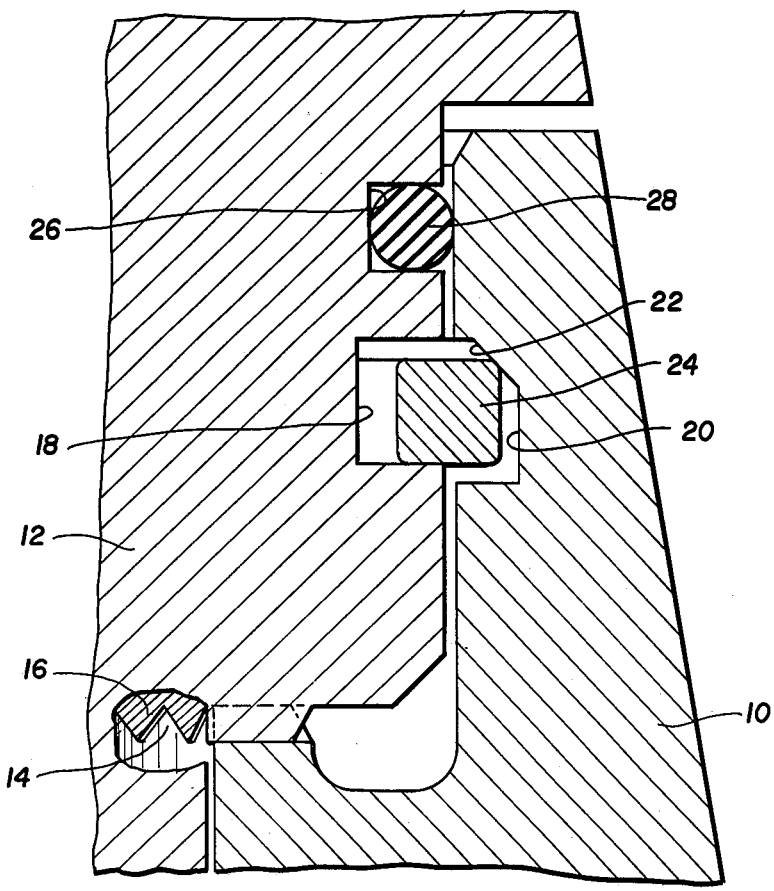
FIG. 1 is a segmented, cutaway view of a fuze incorporating the nonslip turning joint according to the principles of the present invention.

A fuze, as illustrated in FIG. 1, includes a base 10 and rotatable setting cap 12. A roughened annular surface 14 of base 10 interlocks with a roughened adjacent annular surface of cap 12. Although the roughened surfaces 14 and 16 are illustrated as serrated teeth, any roughened surface requiring relative axial movement between the surfaces to effectuate rotation of the surfaces relative to each other, may be used. It should be noted that the roughened surfaces 14 and 16 are perpendicular to the axis of rotation of the body 10 and cap 12 relative to each other.

Figure 2:
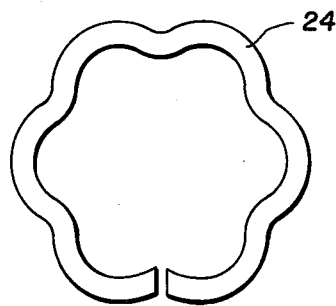
FIG. 2 is a plane view of a sinusoidal split ring used in FIG. 1.

The cap 12 includes an annular recess 18 on the outer surface thereof, and the base 10 includes an annular recess 20 on the inner surface thereof, concentric and adjacent to the annular recess 18 of the cap 12. The wall 22 of annular recess 20, which is furthest from the mating roughened surfaces 14 and 16, is inclined. Resting within the annular recesses 18 and 20 is a split snap ring 24. As illustrated specifically in FIG. 2, the split ring 24 has a plurality of sinusoidal sections in the radial direction thereof. The sinusoidal shape not only increases the resilient action of the snap ring, but also allows the snap ring to simultaneously contact the interior of recesses 18 and 20. Although the split ring 24 illustrated in FIG. 2 includes six complete sinusoidal waves, any number of waves may be used as long as it provides the appropriate force to be described below. A nonsinusoidal ring was tried, but did not provide sufficient axial force.

The cap 12 includes a second annular recess 26 on the outer surface thereof, and an O-ring seal 28 therein. The O-ring 28 seals the joint between the base 10 and the cap 12.

The operations of the elements of the fuze of the present invention cooperate to prevent relative movement of the base 10 and cap 12. The interlocking roughened or serrated surfaces 14 and 16 of the base and cap require relative axial movement or displacement to effectuate a rotational movement or displacement. Although a torque force of generally 350 foot-pounds may be experienced by the fuze during firing, the set-back forces along the axis of rotation is sufficient in combination with the serrated edges to prevent relative rotational movement of the cap and the base. In the prior art, the use of smooth mating surfaces required extensive mechanisms to increase the frictional engagement of the two members. Thus the locking serrated edges take advantage of the set-back axial force produced in firing.

The split ring 24 in combination with the inclined surface 22 provides the needed axial force during the static condition of the fuze to define a minimum torque required to cause the serrated edges to ride up over each other, thereby producing rotational and axial movement of the cap relative to the base. Since the interlocking serrated mating surfaces take advantage of the setback force in the dynamic loading conditions, the split ring 24 need not produce an axial force as great as that required by prior art biasing means for smooth mating surface joints. Prior art devices have generally been designed to require a static loading of a minimum of 115 inch-pounds of torque in addition to setback forces to reduce relative motion of the smooth surfaces during firing. Thus in a static condition a minimum of 150 inch-pounds of torque is needed to set the fuze by rotation of the cap relative to the base. The fuze of the present invention has been designed to require a torque of 50 inch-pounds in the static position to turn the cap relative to the base since the setback forces are sufficient in combination with the serrated surface to prevent relative motion during firing. Preferably, the axial force should be sufficient to require a minimum torque of 40 inch-pounds to rotate the members relative to each other. This would put it out of the range of most human beings without the use of a tool. It is this requirement that makes the fuze resistant to turning during a normal handling.

To set the fuze under static conditions, a tool is applied to the exterior of the cap so as to rotate the cap relative to the base. As the cap is moved, the serrated surface 16 rides up over the serrated surface 14 axially displacing the cap 12 relative to the base 10. This axial movement also axially displaces the split ring 24 causing the outer edge to ride up the inclined surface 22. As the split ring 24 moves up the inclined surface 22, the split ring 24 is forced inward compressing the waves in the ring. It is this compressional force which defines the minimum torque required to produce axial displacement so as to allow rotational movement of the cap 12 relative to the base 10. The compression on split ring 24 is a function of the inclined surface 22 and is increased and decreased as the serrated surface 16 rides up and down over the serrated surface 14. Once the torque is removed, the split ring 24 expands radially riding down the inclined surface 22 and thereby automatically applying force in the axial direction to cause the serrated surface 16 to ride down into mating contact with the serrated surface 14.

It should be noted that by the use of the serrated surfaces 14 and 16, audible and tactile feedback of the rotation of the cap 12 relative to the base 10 is provided. This audible and tactile feedback allows the setting of the fuze in total darkness.

Figure 3:
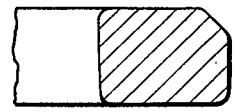
FIG. 3 is a cross-sectional view of a second embodiment of the sinusoidal split ring.

Although the split ring 24 is illustrated as having a rectangular cross-section, the outer top edge of the ring may be inclined to match the incline of inclined surface 22 as illustrated in FIG. 3. This prevents the edge of the split ring from digging into the inclined surface. By providing the recesses 18 and 20 on the lateral surfaces of the cap 12 and base 10, the split ring 24 also serves as a locking device to hold the cap 12 and base 10 together. During assembly, the split ring 24 is placed in recess 18. As the cap 12 is inserted into base 10, the split ring 24 is compressed until the recesses 18 and 20 are aligned, at which point, the split ring expands into recess 20 of the base 10 and locks the cap 12 and base 10 together.

From the preceding description of the preferred embodiment, it is evident that the objects of the invention are attained in that a non-slip turning joint for a fuze is provided. It should be understood that I do not desire it to be limited to the exact detailed construction shown and described, for obvious modifications can be made by persons skilled in the art.

I claim:

1. In a fuze having a first and second member rotatably connected with adjacent annular engaging surfaces perpendicular to the axis of rotation, the improvement comprising:
   said engaging surfaces being sufficiently roughened to require relative axial movement of said members to effectuate relative rotation of said members;
   wherein said first member includes an annular recess on its outer surface, said second member includes an annular recess on its inner surface concentric to the annular recess of said first member, said annular recess of said second member has an inclined surface,
   biasing means including a split ring spring in both of said annular recesses, said spring and inclined surface cooperating to place said spring under sufficient compression to create an axial force requiring a minimum of forty inch-pounds of torque to rotate said members.

2. The fuze according to claim 1 wherein said split ring spring has a sinusoidal configuration in the radial plane.

3. The fuze according to claim 1 wherein said engaging surfaces have interlocking serrations constituting said roughening.

4. In a fuze having a first and second member rotatably connected with adjacent annular engaging surfaces perpendicuar to the axis of rotation, the improvement comprising:
   said engaging surfaces each having serrations extending axially;
   said first member having an annular recess on its outer surface;
   said second member having an annular recess on its inner surface concentric to the annular recess of said first member, the wall of said annular recess of said second member furthest from the engaging surfaces being inclined; and
   a resilient split ring in both of said annular recesses and cooperating with said inclined wall to bias said serrations axially into interlocking engagement.

5. The fuze according to claim 4 wherein the split ring is configured to exert an axial force requiring a minimum of forty inch-pounds of torque to rotate the members relative to each other.

6. The fuze according to claim 4 wherein said split ring has a sinusoidal configuration in the radial plane.

7. The fuze according to claim 6 wherein said split ring has a minimum of six sinusoids about its periphery.

* * * * *